(12) United States Patent
Fukawatase et al.

(10) Patent No.: US 7,766,385 B2
(45) Date of Patent: Aug. 3, 2010

(54) PASSENGER SEAT AIRBAG

(75) Inventors: Osamu Fukawatase, Aichi-ken (JP); Seiji Yamada, Okazaki (JP); Kenichi Takenaka, Chiryu (JP); Shinya Suzuki, Yokohama (JP); Satoru Hirai, Kanagawa-ken (JP)

(73) Assignees: Toyota Jidosha Kabushiki Kaisha, Toyota-shi, Aichi-ken (JP); Kanto Auto Works, Ltd., Kanagawa-ken (JP)

( * ) Notice: Subject to any disclaimer, the term of this patent is extended or adjusted under 35 U.S.C. 154(b) by 97 days.

(21) Appl. No.: 11/990,911

(22) PCT Filed: Aug. 28, 2006

(86) PCT No.: PCT/IB2006/002333

§ 371 (c)(1),
(2), (4) Date: Feb. 25, 2008

(87) PCT Pub. No.: WO2007/026205

PCT Pub. Date: Mar. 8, 2007

(65) Prior Publication Data
US 2009/0146403 A1  Jun. 11, 2009

(30) Foreign Application Priority Data
Aug. 29, 2005 (JP) ............................. 2005-248433

(51) Int. Cl.
B60R 21/16 (2006.01)
(52) U.S. Cl. .................................................. 280/743.2
(58) Field of Classification Search ............. 280/743.2, 280/743.1
See application file for complete search history.

(56) References Cited

U.S. PATENT DOCUMENTS

| 6,196,585 | B1 | 3/2001 | Igawa |
| 6,540,254 | B2* | 4/2003 | Bieber et al. ................. 280/732 |
| 6,969,086 | B2 | 11/2005 | Hasebe et al. |
| 7,458,605 | B2* | 12/2008 | Hasebe et al. ................ 280/729 |
| 2001/0007391 | A1 | 7/2001 | Hamada et al. |
| 2004/0164526 | A1 | 8/2004 | Hasebe et al. |
| 2004/0195807 | A1 | 10/2004 | Hasebe et al. |

FOREIGN PATENT DOCUMENTS

| EP | 1 498 320 | 1/2005 |
| JP | 06-227353 | 8/1994 |
| JP | 11-115667 | 4/1999 |
| JP | 11-170955 | 6/1999 |
| JP | 11-321506 | 11/1999 |
| JP | 2000-159045 | 6/2000 |

(Continued)

*Primary Examiner*—Faye M. Fleming
(74) *Attorney, Agent, or Firm*—Finnegan, Henderson, Farabow, Garrett & Dunner, LLP

(57) ABSTRACT

A passenger-seat airbag (32) includes a left airbag (44), a right airbag (46), and a root portion (48). A strap (70) is provided in the root portion (48) that is inflated by gas injected from an inflator (28) when a passenger-seat airbag device (10) operates. The strap (70) connects the base-end portion (48B) of the root portion (48) to a connection root portion (48C). Further, the strap (70) is provided such that a peripheral length (L2) on a front side is longer than or equal to a peripheral length (L1) on a rear side in a lateral view showing the inflated root portion (48).

14 Claims, 7 Drawing Sheets

FOREIGN PATENT DOCUMENTS

| | | |
|---|---|---|
| JP | 2001-524416 | 12/2001 |
| JP | 2002-19560 | 1/2002 |
| JP | 2003-54353 | 2/2003 |
| JP | 2004-34989 | 2/2004 |
| JP | 2004-314933 | 11/2004 |
| JP | 2005-153668 | 6/2005 |

* cited by examiner

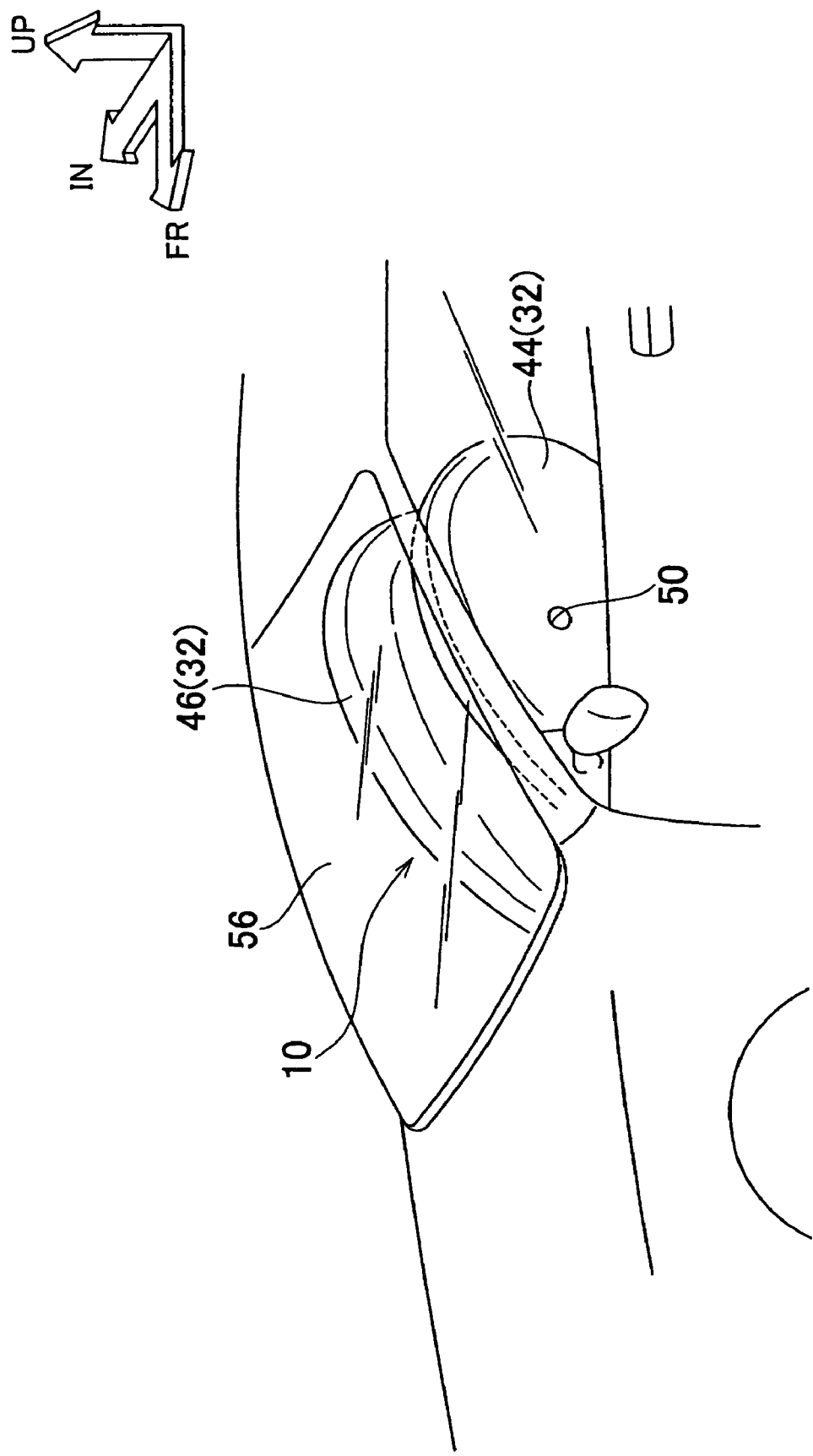

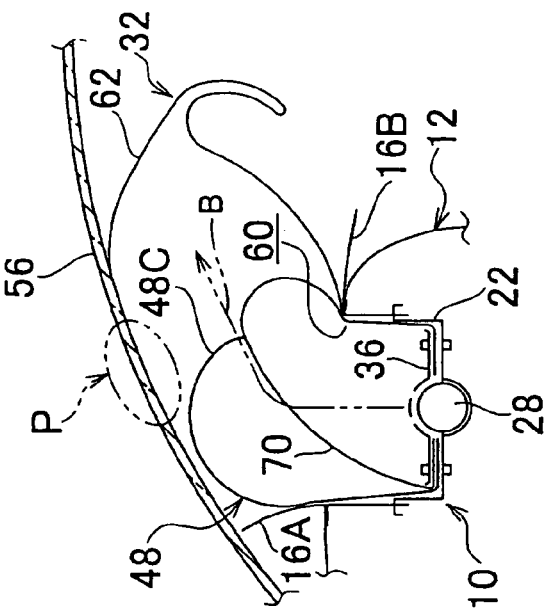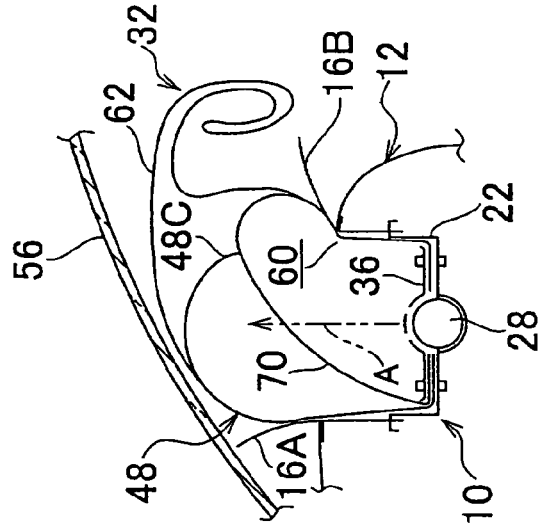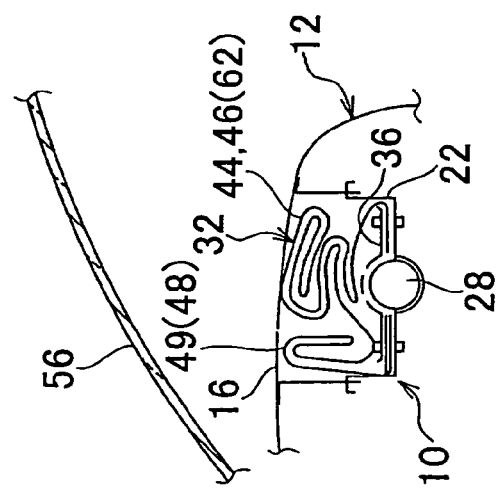

PASSENGER SEAT AIRBAG

BACKGROUND OF THE INVENTION

1. Field of the Invention

The invention relates to a passenger-seat airbag that includes a root portion, and a pair of left and right airbags.

2. Description of the Related Art

Japanese Patent Application Publication No. JP-A-2004-314933 describes a passenger-seat airbag that includes a root portion and a pair of left and right airbags. The root portion receives gas injected from an inflator. The left and right airbags are connected to the root portion, and are deployed toward the rear of a vehicle to restrain the shoulders and the portions around the shoulders of an occupant seated at a passenger seat.

Further, the embodiment of Japanese Patent Application Publication No. JP-A-2004-314933 (FIG. 6 and FIG. 8) describes a technology in which the base-end portion of a base-end chamber (root portion), into which gas is injected from an inflator, is connected to the deepest portion of a valley portion between the left and right airbags by a tether. By providing the tether, the volume of the base-end chamber is reduced so that the base-end chamber is inflated early, and the deepest portion of the valley portion between the left and right airbags is positioned. Accordingly, the posture of the left and right airbags is stabilized when the passenger-seat airbag is being deployed.

However, in the above-described technology, the base-end portion of the base-end chamber is simply connected to the deepest portion of the valley portion between the left and right airbags by the tether. Therefore, further improvement needs to be made to stabilize the direction in which the left and right airbags are deployed.

That is, in the above-described technology, because the end of the tether is fixed to the upper edge (i.e., the edge close to the top of the vehicle) of the deepest portion of the valley portion between the left and right airbags. Therefore, the gas intensively flows into a portion of the base-end chamber below the tether (i.e., the vehicle rear-side portion of the root portion). Accordingly, a portion of the base-end chamber above the tether (i.e., the vehicle front-side portion of the root portion that is close to the windshield) is inflated slowly. This results in the variations of the direction in which the left and right airbags are deployed.

SUMMARY OF THE INVENTION

The invention provides a passenger-seat airbag, which makes it possible to further stabilize the direction in which left and right airbags are deployed.

A first aspect of the invention relates to a passenger-seat airbag that includes a left airbag and a right airbag that correspond to the shoulders of an occupant seated at a passenger seat, and a root portion that receives gas injected from an inflator when the inflator operates, and that connects a left-airbag root portion and a right-airbag root portion. The passenger-seat airbag is folded and stored in an airbag case fixed in an instrument panel. When a frontal collision occurs, the passenger-seat airbag is protruded from a bag-protrusion opening formed in the instrument panel, and is deployed toward the passenger seat. A strap connects the base-end portion of the root portion to a connection root portion positioned between the left-airbag root portion and the right-airbag root portion. In a lateral view, a peripheral length from a junction portion between the connection root portion and the strap to the front edge of the bag-protrusion opening is longer than or equal to a peripheral length from the junction portion between the connection root portion and the strap to the rear edge of the bag-protrusion opening.

According to the first aspect of the invention, the gas is injected from the inflator when the inflator operates at the time of frontal collision, and the gas is supplied to the root portion of the passenger-seat airbag that is folded and stored in the airbag case. The root portion connects the left-airbag root portion and the right-airbag root portion. Therefore, the gas supplied to the root portion flows into the left airbag and the right airbag. Thus, the passenger-seat airbag is protruded from the bag-protrusion opening formed in the instrument panel. Then, the left airbag and the right airbag are deployed toward the passenger seat. The left airbag receives the left shoulder of the occupant seated at the passenger seat. The right airbag receives the right shoulder of the occupant. Both of the airbags receive the upper part of the occupant's body such that the upper part of the occupant's body is in a stable state. Thus, the left and right airbags absorb the impact at the time of frontal collision, and the load applied to the occupant from the airbags is dispersed and reduced.

According to the above-described aspect, the strap connects the base-end portion of the root portion to the connection root portion positioned between the left-airbag root portion and the right-airbag root portion. Therefore, the following effects can be obtained.

That is, if the strap were not provided, the root portion would be inflated to have a spherical shape by the gas. This would result in the variations of the direction in which the left and right airbags connected to the root portion are deployed. In addition, as the root portion has a larger spherical shape, the time required to inflate the root portion is longer. Therefore, the left and right airbag would be deployed before the inflation of the root portion is completed. This would also result in the variations of the direction in which the left and right airbag are deployed. Accordingly, the strap connects the base-end portion of the root portion to the connection root portion positioned between the left-airbag root portion and the right-airbags root portion. The strap pulls the connection root portion toward the base-end portion of the root portion, thereby reducing the volume of the root portion. Also, because the strap pulls the junction portion, the root portion has a shape obtained by stacking two cylinders, instead of the spherical shape. Therefore, the root portion has a long side in the lateral view. Because the left and right airbags are deployed along the long side, the direction in which the left and right airbags are deployed can be regulated. Thus, it is possible to inflate the root portion early, and regulate the direction in which the left and right airbags are deployed. As a result, the direction in which the left and right airbags are deployed is stabilized early.

Further, in the above-described aspect, in addition to providing the strap in the root portion, in the lateral view, the peripheral length L2 from the junction portion between the connection root portion and the strap to the front edge of the bag-protrusion opening is longer than or equal to the peripheral length L1 from the junction portion to the rear edge of the bag-protrusion opening. In other words, the length of the strap and the position of the junction portion are set such that the peripheral length L2 is longer than or equal to the peripheral length L1. Therefore, a vehicle front-side portion of the root portion, which has the peripheral length L2, is inflated earlier than a vehicle rear-side portion of the root portion, which has the peripheral length L1. The vehicle front-side portion is positioned closer to the front of the vehicle than the vehicle rear-side portion is. The vehicle rear-side portion is positioned closer to the rear of the vehicle than the vehicle front-side portion is. Thus, the vehicle front-side portion fills the space between the windshield and the instrument panel early. As a result, it is possible to further stabilize the direction in which the left and right airbags are deployed, as compared to the case where the strap is simply provided in the root portion.

The passenger-seat airbag has the excellent effect of further stabilizing the direction in which the left and right airbags are deployed.

In the first aspect of the invention, the volume of one of the left and right airbags, which is positioned on an inner side in a vehicle-width direction, may be larger than the volume of another of the left and right airbags, which is positioned on an outer side in the vehicle-width direction. The strap may have a substantially trapezoid shape in which a vehicle front-side base is longer than a vehicle rear-side upper side. The vehicle rear-side upper side may be offset to the airbag on the outer side in the vehicle-width direction, with respect to the vehicle front-side base.

In the above-described aspect, the gas injected from the inflator is supplied to the left and right airbags through the gaps on the left and right sides of the strap. Because the strap has a substantially trapezoid shape according to the invention, the gaps on the left and right sides of the strap are large, as compared to the case where the strap has, for example, a rectangular shape. As a result, the vehicle front-side portion of the root portion can be inflated earlier.

Further, the vehicle rear-side upper side of the strap is offset to the airbag on the outer side in the vehicle-width direction, with respect to the vehicle front-side base. Therefore, the area of a gas supply passage, through which the gas is supplied to the airbag that is positioned on the inner side in the vehicle-width direction, and that has a larger volume, may be larger than the area of another gas supply passage, through which the gas is supplied to the airbag that is positioned on the outer side in the vehicle-width direction, and that has a smaller volume. Accordingly, it is possible to uniformly inflate the left and right airbags that have different volumes.

The passenger-seat airbag according to the above-described aspect has the excellent effect that the root portion can be inflated early, and the left and right airbags can be uniformly inflated.

In the first aspect, the volume of one of the left and right airbags, which is positioned on an inner side in a vehicle-width direction, may be larger than the volume of another of the left and right airbags, which is positioned on an outer side in the vehicle-width direction. Also, gas supply holes, through which the gas is supplied to the left and right airbags, may be formed in the strap. In this case, the opening areas of the gas supply holes are different from each other, and the opening areas correspond to the volumes of the left and right airbags.

According to the above-described aspect, the gas injected from the inflator is supplied to the left and right airbags through the gaps on the left and right sides of the strap. Because the gas supply holes, through which the gas is supplied to the left and right airbags, are formed in the strap, the vehicle front-side portion of the root portion can be inflated early, as compared to the case where the strap has, for example, a rectangular shape, and does not have a hole.

Further, the opening areas of the gas supply holes are different from each other, and the opening areas correspond to the volumes of the left and right airbags. Therefore, it is possible to uniformly inflate the left and right airbags that have different volumes.

The passenger-seat airbag according to the above-described aspect has the excellent effect that the root portion can be inflated early, and the left and right airbags that have different volumes can be uniformly inflated.

In the first aspect, the volume of one of the left and right airbags, which is positioned on an inner side in a vehicle-width direction, may be larger than the volume of another of the left and right airbags, which is positioned on an outer side in the vehicle-width direction. The strap may have a rectangular shape, and gas supply holes, through which the gas is supplied to the left and right airbags, may be formed in the strap. Further, the opening area of the gas supply hole corresponding to the airbag on the inner side in the vehicle-width direction may be larger than the opening area of the gas supply hole corresponding to the airbag on the outer side in the vehicle-width direction.

The length of the strap and the position of the junction portion may be set such that the inflated root portion does not contact a windshield, and the upper edges of the left and right airbags contact the windshield at two left and right positions when the passenger-seat airbag is completely deployed.

According to the above-described aspect, the length of the strap and the position of the junction portion are set such that the inflated root portion does not contact the windshield. Therefore, it is possible to avoid the situation where a large load is input to a specific portion of the windshield in the early stage of inflation of the passenger-seat airbag.

Further, the length of the strap and the position of the junction portion are set such that the upper edges of the left and right airbags contact the windshield at two left and right positions. Therefore, it is possible to stabilize the direction in which the left and right airbags are deployed, and to stabilize the posture of the left and right airbags when the passenger-seat airbag is completely deployed.

The passenger-seat airbag has the following excellent effects. That is, it is possible to avoid the situation where a large load is input to a specific portion of the windshield. It is also possible to further stabilize the direction in which the left and right airbags are deployed, and the posture of the left and right airbags after the passenger-seat airbag is deployed.

In the above-described aspect, an airbag folded portion may be formed by folding an airbag body which is positioned closer to the rear of a vehicle than the root portion is when the passenger-seat airbag is provided in the vehicle; and the root portion, which is positioned closer to the front of the vehicle than the airbag body is when the passenger-seat airbag is provided in the vehicle, may be made slack to form a slack portion, and the slack portion may be made upright along the airbag folded portion.

In the above-described aspect, the airbag folded portion may be formed mainly by rolling up the airbag body. The airbag folded portion may be formed mainly by accordion-folding the airbag body. Alternatively, the airbag folded portion may be formed by rolling up the airbag body and accordion-folding the airbag body substantially the same number of times.

In the above-described aspect, the tip portion of the root portion may be accordion-folded once toward the airbag folded portion. Alternatively, the tip of the root portion may be bent toward the airbag folded portion at a substantially right angle.

In the above-described aspect, an airbag folded portion may be formed mainly by rolling up the left and right airbags which are positioned closer to the rear of a vehicle than the root portion is when the passenger-seat airbag is provided in the vehicle; the root portion, which is positioned closer to the front of the vehicle than the left and right airbags are when the passenger-seat airbag is provided in the vehicle, may be made slack to form a slack portion; the slack portion may be made upright along the airbag folded portion that is formed mainly by rolling up the left and right airbags; and the tip portion of the slack portion may be accordion-folded.

In the above-described aspect, the airbag folded portion is formed mainly by rolling up the left and right airbags which are positioned closer to the rear of the vehicle than the root portion is when the passenger-seat airbag is provided in the vehicle; the root portion, which is positioned closer to the front of the vehicle than the left and right airbags are, is made slack to form a slack portion; and the slack portion is made upright along the airbag folded portion that is formed mainly by rolling up the left and right airbags. Therefore, the gas injected from the inflator flows into the slack portion that forms the root portion more easily than into the rolled-up left and right airbags. Accordingly, the root portion is expanded and deployed earlier than the left and right airbags. Also, at this time, the root portion that connects the left-airbag root portion and the right-airbag root portion forms the "wall". Therefore, it is possible to extremely effectively stabilize the direction in which the left and right airbags are expanded and deployed toward the passenger seat.

Further, by accordion-folding the tip portion of the slack portion that forms the root portion, the root portion can be expanded and deployed quickly even if the height of the slack portion is larger than the height of the airbag folded portion that is formed mainly by rolling up the left and right airbags. That is, the root portion is made slack to form slack portion when the airbag body is folded, the slack portion of the root portion may be somewhat long in the lateral view. Therefore, when the slack portion is made upright along the airbag folded portion, the tip portion may protrude beyond the airbag folded portion. In this case, by accordion-folding the tip portion of the slack portion, the root portion is not prevented from being expanded and deployed quickly.

The passenger-seat airbag according to the above-described aspect has the excellent effect that the root portion can be expanded and deployed quickly.

BRIEF DESCRIPTION OF THE DRAWINGS

The foregoing and/or further objects, features and advantages of the invention will become more apparent from the following description of example embodiments with reference to the accompanying drawings, in which the same or corresponding portions are denoted by the same reference numerals and wherein:

FIG. 5 is a perspective view showing the outer appearance of the deployed passenger-seat airbag shown in FIG. 1, which is viewed from the outside of the vehicle;

FIGS. 6A to 6C are diagrams explaining the operation of the passenger-seat airbag device according to the embodiment of the invention.

DETAILED DESCRIPTION OF THE EXAMPLE EMBODIMENTS

Hereinafter, a passenger-seat airbag according to each of embodiments of the invention will be described with reference to FIG. 1 to FIG. 7. In FIG. 1 to FIG. 7, an arrow FR indicates the front of a vehicle, an arrow UP indicates the top of the vehicle, and an arrow IN indicates the inside of the vehicle in a vehicle-width direction.

I. Entire Configuration of the Passenger-Seat Airbag Device 10

Figure 4:
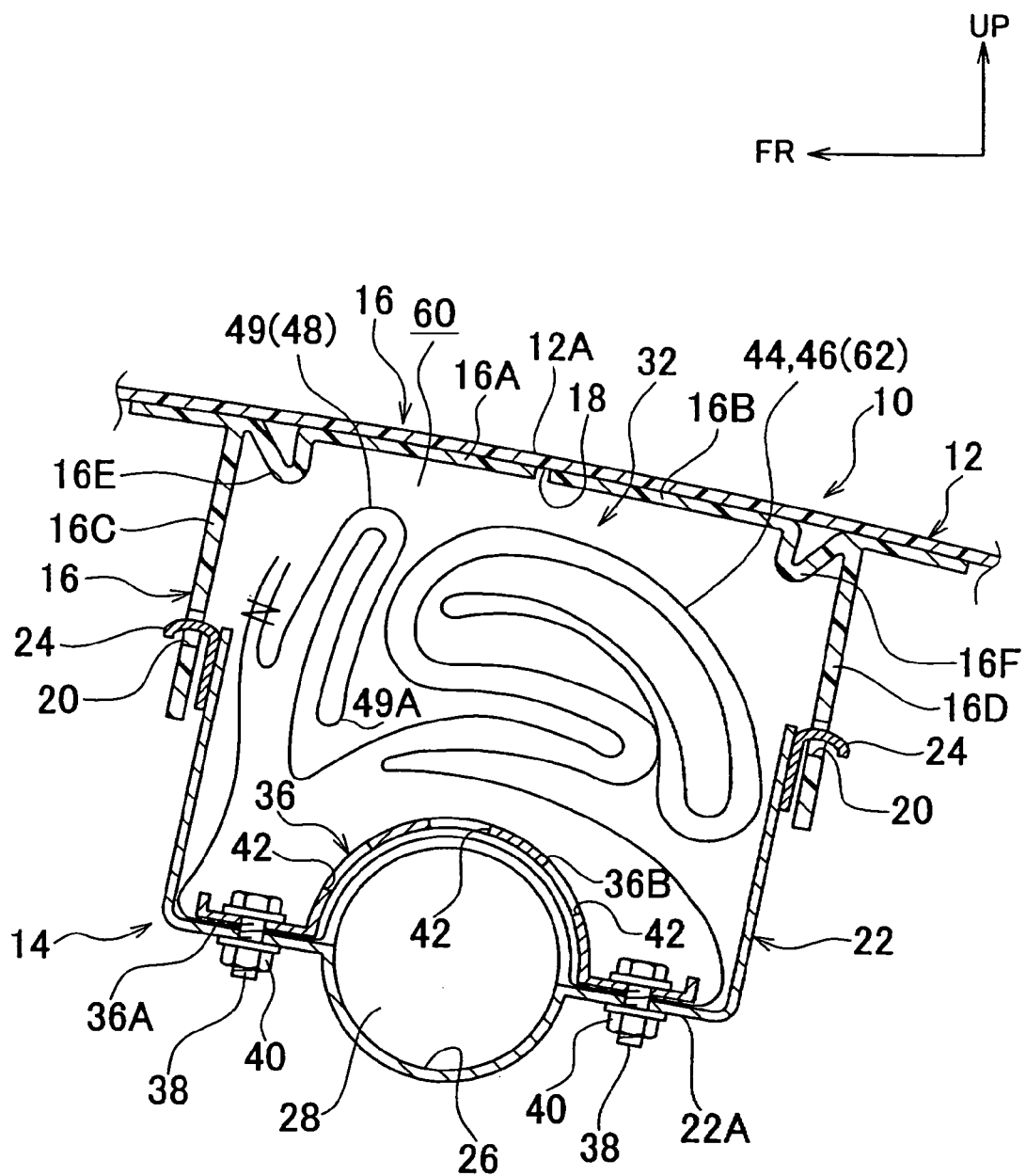
FIG. 4 is a longitudinal cross sectional view of a passenger-seat airbag device that includes the passenger-seat airbag according to the embodiment of the invention, which is provided in a vehicle.

FIG. 4 is a longitudinal sectional view showing a passenger-seat airbag device 10 according to an embodiment of the invention, which is provided in the vehicle. FIG. 5 is a perspective view showing the passenger-seat airbag device 10 that is operated.

As shown in FIG. 4 and FIG. 5, the passenger-seat airbag device 10 is provided under a top wall portion 12A of an instrument panel 12 at a position near the passenger seat. The passenger-seat airbag device 10 includes an airbag module 14 and an airbag door 16. Functional components are stored in the airbag module 14. The airbag door 16 closes an opening at the upper end of the airbag module 14.

The airbag door 16 is provided on the rear side of the top wall portion 12A of the instrument panel 12. The airbag door 16 includes a pair of pivot portions 16A and 16B; and a pair of leg portions 16C and 16D. The pivot portions 16A and 16B pivot toward the front and rear of the vehicle, respectively. The leg portion 16C extends from the rear side of the pivot portion 16A substantially toward the bottom of the vehicle. The leg portion 16D extends from the rear side of the pivot portion 16B substantially toward the bottom of the vehicle. An opening 20 is formed in each of the leg portions 16C and 16D. The pivot portions 16A and 16B are connected to the leg portions 16C and 16D via hinges 16E and 16F, respectively. A tear line 18, which has a substantially H-shape in a plan view, is provided in the airbag door 16. The tear line 18 is invisible. When the expansion pressure of the airbag, which is greater than or equal to a predetermined value, is applied to the tear line 18, the tear line 18 is torn so that the pivot portions 16A and 16B pivot toward the front and rear of the vehicle, respectively.

The airbag module 14 includes an airbag case 22 that has a substantially box shape. The airbag case 22 is supported by a reinforcement member (not shown) such as an instrument panel reinforcement, via a bracket. An engagement portion 24, which has a hook shape, is provided in each of the front wall and rear wall of the airbag case 22. The openings 20 of the leg portions 16C and 16D are engaged with the engagement portions 24 so that the airbag door 16 is fitted to the airbag case 22.

A recess 26, which is a portion protruding toward the bottom of the vehicle, is formed in the bottom wall 22A of the airbag case 22 at the center in a fore-and-aft direction. The recess 26 has a semi-circular cross section. An inflator 28, which has a substantially cylindrical shape, is housed in the recess 26. A passenger-seat airbag 32, which is folded, is housed above the inflator 28. When the inflator 28 injects gas, the passenger-seat airbag 32 is inflated, which opens the airbag door 16. Thus, the passenger-seat airbag 32 is expanded toward an occupant seated at the passenger seat.

An opening is formed in a root portion 48 (described later) of the passenger-seat airbag 32. Gas is supplied to the passenger-seat airbag 32 through the opening. A metallic retainer 36 is fitted to the inside of the opening. The retainer 36 includes an outer periphery 36A and a body 36B inside the outer periphery 36A. The outer periphery 36A has a substantially rectangular-frame shape. The body 36B has a hollow semi-cylindrical shape. The upper half of the inflator 28 is fitted in the body 36B. Bolts 38, which protrude from the outer periphery 36A of the retainer 36 toward the bottom of the vehicle, are screwed into nuts 40. As a result, the retainer 36 is fixed to the bottom wall 22A of the airbag case 22, and the inflator 28 is fixed to the recess 26 of the bottom wall 22A. A plurality of openings 42 are formed in the body 36B of the retainer 36. Thus, the retainer 36 functions as a diffuser that adjusts the flow of gas.

A plurality of gas-injection holes (not shown) are formed in a predetermined arrangement in the peripheral wall of the inflator 28 at predetermined positions. When a front airbag sensor and a center airbag sensor (neither of them are shown) detect a frontal collision, an airbag ECU (not shown) operates the inflator 28 so that gas is injected through the gas-injection holes. The front airbag sensor is provided in the front portion of the vehicle at a predetermined position. The center airbag sensor is provided in the center portion of the vehicle.

Next, the structure of the passenger-seat airbag 32 that is expanded by the gas injected from the inflator 28 will be described.

Figure 1:
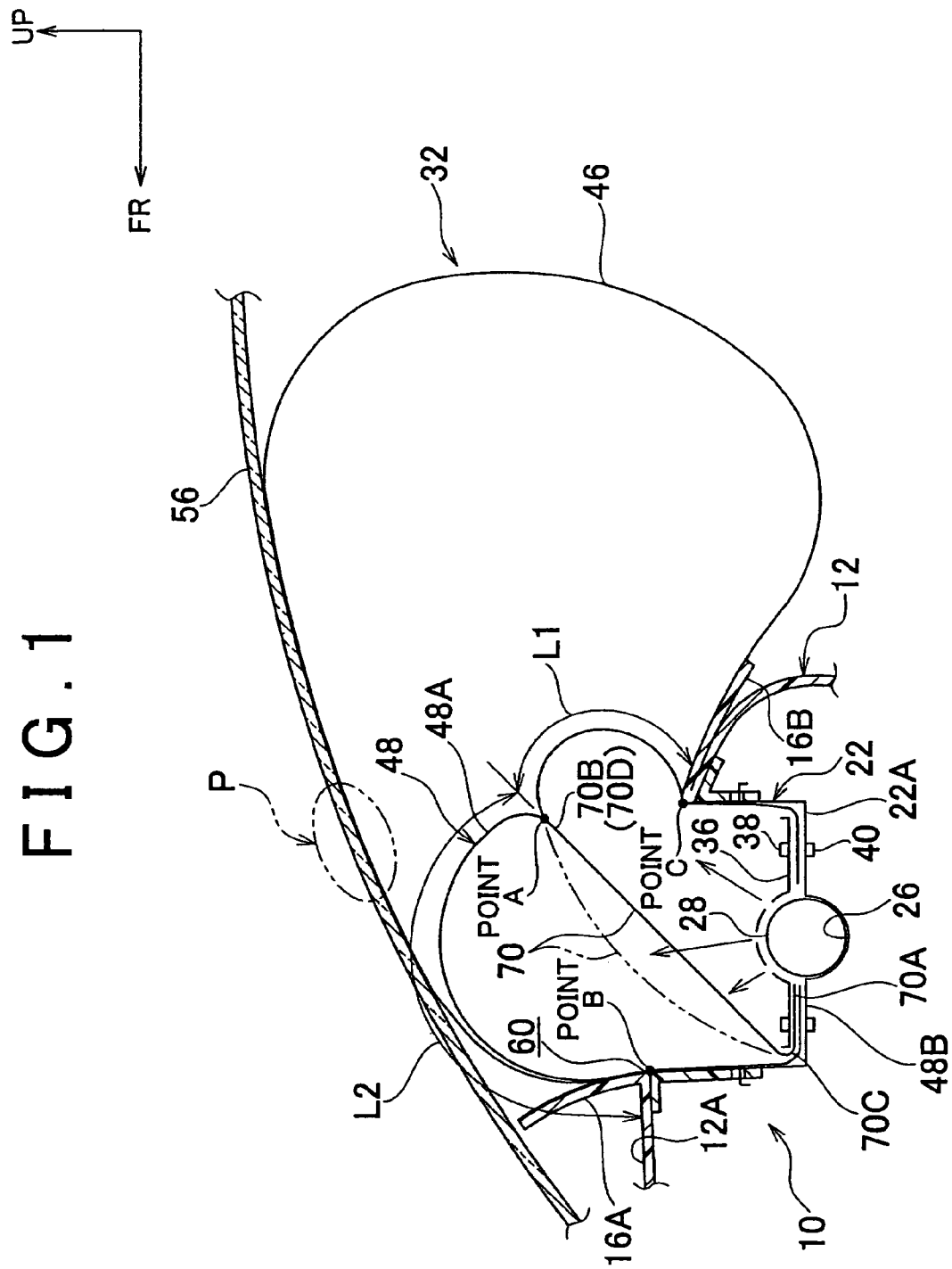
FIG. 1 is a longitudinal cross sectional view showing a passenger-seat airbag according to an embodiment of the invention, which is deployed.
Figure 2:
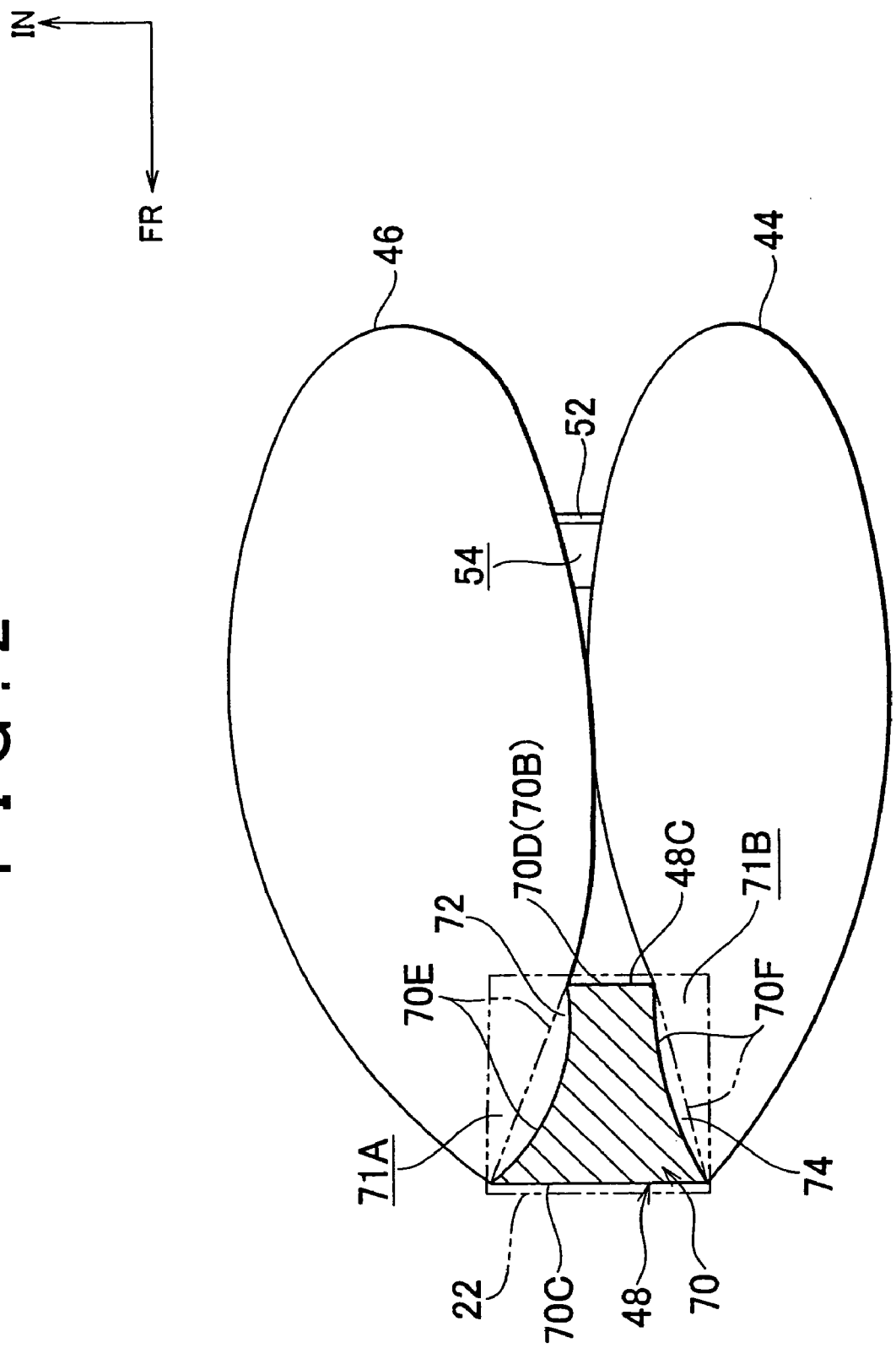
FIG. 2 is a horizontal cross sectional view of the passenger-seat airbag shown in FIG. 1.
Figure 3:
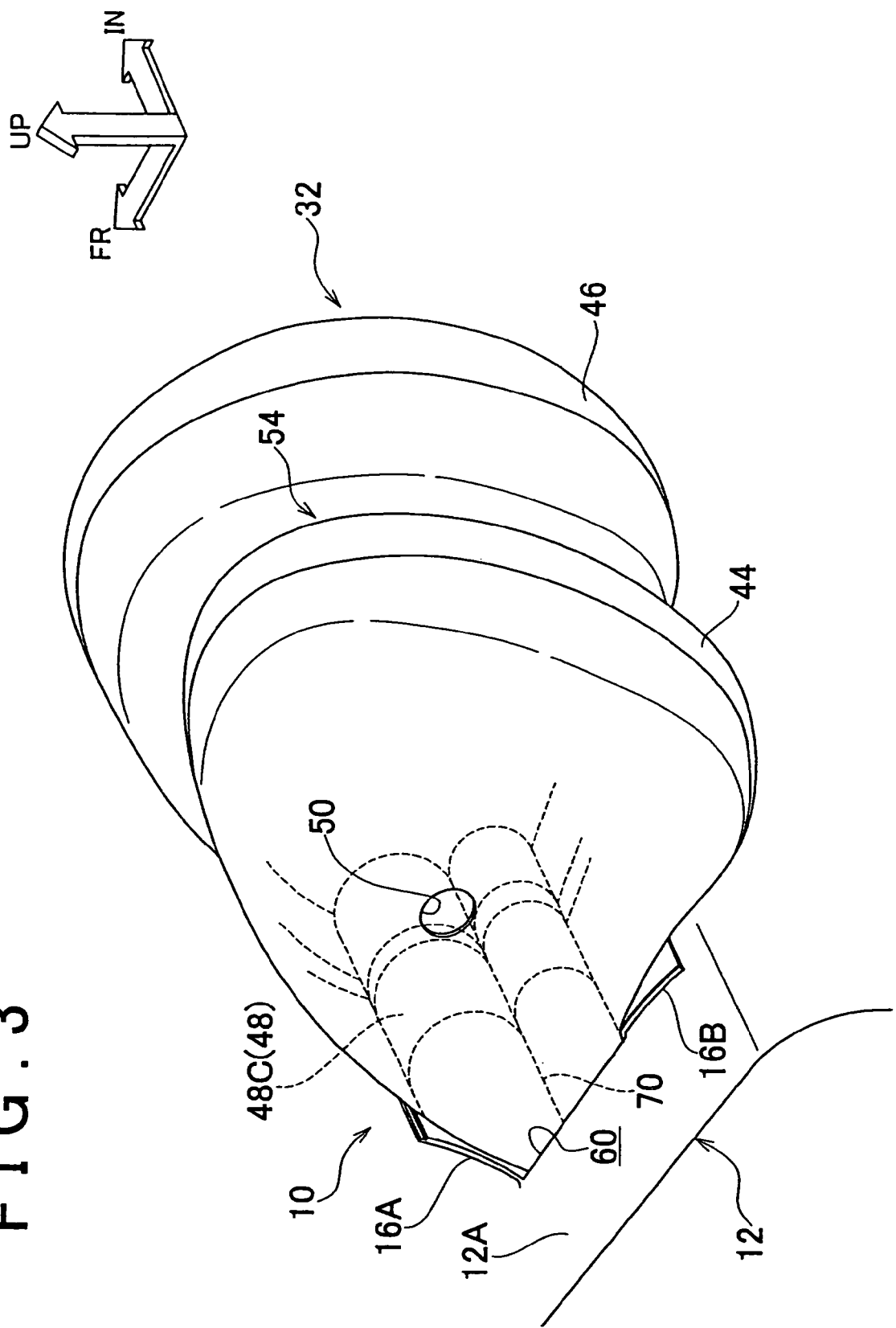
FIG. 3 is a perspective view of the passenger-seat airbag shown in FIG. 1, which is viewed from an occupant side.

As shown in FIG. 1 to FIG. 3, the passenger-seat airbag 32 includes a left airbag 44, a right airbag 46, and a root portion 48. The left airbag 44 is inflated ahead of, and on the left side of the occupant seated at the passenger seat so that the left airbag 44 receives mainly the left shoulder of the occupant. The right airbag 46 is inflated ahead of, and on the right side of the occupant so that the right airbag 46 receives mainly the right shoulder of the occupant. The root portion 48 connects the root portion of the left airbag 44 (i.e., left-airbag root portion) and the root portion of the right airbag 46 (i.e., right-airbag root portion).

In a lateral view, each of the left airbag 44 and the right airbag 46 is formed such that the length in the vehicle-height direction increases from a front end toward a rear end. The volume of the right airbag 46 positioned on an inner side in the vehicle-width direction is larger than the volume of the left airbag 44 positioned on an outer side in the vehicle-width direction. Further, a vent hole 50 is formed near the center of the outer portion of each of the left airbag 44 and the right airbag 46 (refer to FIG. 3). When the left airbag 44 and the right airbag 46 receive the occupant, the gas is discharged through the vent holes 50 so that the pressure inside the airbags is reduced.

When the passenger-seat airbag 32 is inflated, the substantially center of the inner portion of the left airbag 44 contacts the substantially center of the inner portion of the right airbag 46 (refer to FIG. 2). This prevents the left airbag 44 and the right airbag 46 from being bent at the center positions thereof when the occupant moves toward the front of the vehicle due to inertia and a load is applied to the rear ends of the left airbag 44 and the right airbag 46 by the occupant at the time of frontal collision.

A tie panel 52 made of cloth connects the rear end of the left airbag 44 with the rear end of the right airbag 46 in the vehicle-width direction (refer to FIG. 2). The tie panel 52 has a rectangular shape when viewed from the occupant side. The tie panel 52 is provided at such a position and in such a range that the tie panel 52 can receive the chest of the occupant when the occupant moves toward the front of the vehicle due to inertia at the time of frontal collision. Thus, the tie panel 52 softly receives the chest of the occupant at the time of frontal collision. As described above, when the left airbag 44 and the right airbag 46 are inflated, the inner portion of the left airbag 44 contacts the inner portion of the right airbag 46, which reduces a space 54 on the rear side of the tie panel 52 (refer to FIG. 2 and FIG. 3). This prevents the chest of the occupant from being excessively inserted between the left airbag 44 and the right airbag 46. In a broad sense, the tie panel 52 is a member that connects the rear end of the left airbag 44 with the rear end of the right airbag 46 in the vehicle-width direction.

As described above, the root portion 48 connects the root portion of the left airbag 44 (left-airbag root portion) and the root portion of the right airbag 46 (right-airbag root portion). That is, the left airbag 44 and the right airbag 46 have the root portion 48 in common. When the inflator 28 injects gas into the root portion 48, the passenger-seat airbag 32, which is folded in the manner described below, is inflated.

An airbag folded portion 62 is formed mainly by rolling up the left and right airbags 44 and 46 (for example, in this embodiment, the airbag folded portion 62 is formed by accordion-folding the left and right airbags 44 and 46 once, and rolling up the left and the right airbags 44 and 46 twice). Also, the root portion 48 is made slack to form a slack portion 49, and the slack portion 49 is made upright along the airbag folded portion 62. As shown in FIG. 4, the passenger-seat airbag 32 is housed in the airbag case 22 such that the airbag folded portion 62 is positioned closer to the rear of the vehicle than the root portion 48 is, and the root portion 48 is positioned closer to the front of the vehicle than the airbag folded portion 62 is when the passenger-seat airbag 32 is provided in the vehicle. Further, the tip portion 49A of the slack portion 49 is accordion-folded toward the airbag folded portion 62 (for example, in this embodiment, the tip portion 49A is accordion-folded once).

As described above, the passenger-seat airbag 32 includes the left airbag 44 and the right airbag 46, and the tie-panel 52 connects the tip portions of the left airbag 44 and the right airbag 46. Therefore, portions of each of the left and right airbags 44 and 46, which are lower and upper portions in a vehicle-height direction when each of the left and right airbags 44 and 46 is deployed in the vehicle, are folded toward the center of each of the left and right airbags 44 and 46 such that each of the left and right airbags 44 and 46 has a long strip shape. Then, after the left and right airbags 44 and 46 are overlapped with each other, the end portion of the passenger-seat airbag 32 in a longitudinal direction (i.e., the end near the tie-panel 52) is rolled up toward the slack portion 49. Then, after the slack portion 49 is extended, the slack portion 49 is made upright along the airbag folded portion 62. The entire length of the slack portion 49 is slightly larger than the height of the airbag folded portion 62. Therefore, a tip portion 49A that protrudes beyond the airbag folded portion 62 is accordion-folded once toward the airbag folded portion 62 (i.e., toward the rear of the vehicle).

In this embodiment, a strap 70 is provided in the above-described root portion 48. The strap 70 regulates the inflation of the root portion 48. Hereinafter, the strap 70 will be described in detail.

As shown in FIG. 1 to FIG. 3, the strap 70 is a cloth member made of one kind of material. The strap 70 has a substantially trapezoid shape.

The front end portion 70A of the strap 70 (refer to FIG. 1) is sewn to the inner side of the front end portion 48B of the root portion 48 (refer to FIG. 1) such that the front end portion 70A is overlapped with the inner side of the front end portion 48B. The front end portion 70A of the strap 70 and the front end portion 48B of the root portion 48 are fastened to the bottom wall 22A of the airbag case 22 by the above-described retainer 36. The front end portion 48B of the root portion 48 is equivalent to "the base-end portion of the root portion" according to the invention. The rear end portion 70B of the strap 70 (refer to FIG. 1 and FIG. 2) is sewn to a connection root portion 48C that is positioned between the root portions of the left and right airbags 44 and 46 (i.e., between the left-airbag root portion and the right-airbag root portion). The connection root portion 48C is a part of the root portion 48. If the strap 70 were not provided, the connection root portion 48C would be inflated to have a spherical shape. Thus, the strap 70 connects the base-end portion 48B of the root portion 48 to the connection root portion 48C positioned between the root portions of the left and right airbags 44 and 46 (i.e., between the left-airbag root portion and the right-airbag root portion) in a substantially diagonal direction.

In a plan view showing the deployed passenger-seat airbag 32 including the strap 70, the strap 70 has a substantially trapezoid shape. A vehicle front-side base 70C (refer to FIG. 1 and FIG. 2) is longer than a vehicle rear-side upper side 70D (refer to FIG. 1 and FIG. 2). The vehicle front-side base 70C is closer to the front of the vehicle than the vehicle rear-side upper side 70D is. The vehicle rear-side upper side 70D is closer to the rear of the vehicle than the vehicle front-side base 70C is. As evident from the above structural description with reference to FIG. 1, the vehicle front-side base 70C of the strap 70 is formed by folding back the strap 70 by the front edge of the outer periphery 36A of the retainer 36. The vehicle rear-side upper side 70D is the edge of the rear end portion 70B of the strap 70, which is sewn to the connection root portion 48C.

Further, in this embodiment, as shown in FIG. 1, in the lateral view showing the deployed passenger-seat airbag 32, a peripheral length L2 from a junction portion (point A) to the front edge (point B) of the bag-protrusion opening 60 is longer than or equal to a peripheral length L1 from the junction portion (point A) to the rear edge (point C) of the bag-protrusion opening 60. The junction portion (point A) is the portion where the connection root portion 48C is connected to the rear end portion 70B of the strap 70. The bag-protrusion opening 60 is formed in the instrument panel 12 when the airbag door 16 is opened. In other words, the length of the strap 70 and the position of the junction portion (point A) are set such that peripheral length L2 is longer than or equal to the peripheral length L1.

Also, as shown in FIG. 2, the volume of the right airbag 46 positioned on the inner side in the vehicle-width direction is larger than the volume of the left airbag 44 positioned on the outer side in the vehicle-width direction. Therefore, in the plan view showing the deployed passenger-seat airbag 32, the vehicle rear-side upper side 70D of the strap 70 is offset to the left airbag 44 positioned on the outer side in the vehicle-width direction, with respect to the vehicle front-side base 70C. Thus, in the plan view showing the passenger-seat airbag 32 that is being deployed, the opening area of a gas supply passage 71A is larger than the opening area of a gas supply passage 71B. The gas supply passage 71A has a substantially right-angle triangle, and is formed on the inner oblique line 70E-side of the airbag case 22. The gas supply passage 71B is formed on the outer oblique line 70F-side of the airbag case 22. Gaps 72 and 74 are formed on the inner oblique line 70E-side and on the outer oblique line 70F-side when the shape of the strap 70 is changed from the shape shown by two-dot chain lines to shape shown by oblique lines. When the strap 70 is deployed on a plane, the strap 70 has the shape shown by the two-dot chain lines. When the passenger-seat airbag 32 is inflated by gas, the strap 70 has the shape shown by the oblique lines. The area of the gap 72 on the inner side is larger than that of the gap 74 on the outer side.

Further, as shown in FIG. 1, the length of the strap 70 and the position of the junction portion (point A) between the strap 70 and the connection root portion 48C are set such that the inflated root portion 48 does not contact the windshield 56, and the upper edges of the left and right airbags 44 and 46 contact the windshield 56 at two left and right positions, in the lateral view showing the passenger-seat airbag 32 that is completely deployed. When the passenger-seat airbag 32 is being deployed, each of the left and right airbag 44 and 46 contacts the windshield 56 at a position shown by line "P" in FIG. 1. In other words, when the passenger-seat airbag 32 is being deployed, a large area of each of the left and right airbags 44 and 46 does not contact the windshield 56, that is, the passenger-seat airbag 32 is not in the state shown in FIG. 1. Instead, the passenger-seat airbag 32 is in the state shown in FIG. 6C.

II. Effects

Next, the effects obtained in this embodiment will be described.

First, the overall effect of the passenger-seat airbag device 10 in this embodiment will be summarized. When the front airbag sensor and the center airbag sensor (neither of them are shown) detect a frontal collision, the airbag ECU (not shown) operates the inflator 28 so that gas is injected through the plurality of gas-injection holes formed in the peripheral wall of the inflator 28. After the retainer 36, which functions as the diffuser, adjusts the flow of the injected gas, the gas flows into the passenger-seat airbag 32.

Accordingly, the passenger-seat airbag 32 is inflated. When the pressure inside the passenger-seat airbag 32 reaches a predetermined value, the airbag door 16 is torn along the tear line 18, and the airbag door 16 is opened in the fore-and-aft direction of the vehicle. After the airbag door 16 is opened, the bag-protrusion opening 60 is formed in the top wall 12A of the instrument panel, and the passenger-seat airbag 32 is protruded toward the windshield 56. When the passenger-seat airbag 32 is completely deployed, the left airbag 44 receives mainly the left shoulder of the occupant seated at the passenger seat. The right airbag 46 receives mainly the right shoulder of the occupant. Further, the tie-panel 52 receives mainly the chest of the occupant. As a result, the passenger-seat airbag 32 protects the occupant from the impact of the frontal collision. In addition, immediately after the passenger-seat airbag 32 starts to be deployed, the passenger-seat airbag 32 receives the occupant at a plurality of portions such as the shoulders, and the load applied to the occupant can be dispersed. Accordingly, the load applied to the occupant can be reduced.

The operation of the passenger-seat airbag device 10 will be described with reference to the drawings. Before the passenger-seat airbag device 10 operates, the passenger-seat airbag 32 is in the state shown in FIG. 6A. In this state, the airbag folded portion 62 is positioned closer to the rear of the vehicle than the slack portion 49 is, in the airbag case 22. The airbag folded portion 62 forms the left airbag 44 and the right airbag 46, and occupies a large portion of the passenger-seat airbag 32. Also, the slack portion 49 is made upright along the airbag folded portion 62, and is positioned closer to the front of the vehicle than the airbag folded portion 62 is, in the airbag case 22. The slack portion 49 forms the root portion 48 that connects the root portion of the left airbag 44 (left-airbag root portion) and the root portion of the right airbag 46 (right-airbag root portion).

After the passenger-seat airbag device 10 operates in this state, it takes time for the gas to flow into the airbag folded portion 62 that is formed by rolling-up the left and right airbags 44 and 46 twice and accordion-folding the left and right airbags 44 and 46 once, as shown in FIG. 6B. That is, the airbag folded portion 62 is not unfolded easily. Therefore, the gas intensively flows into the slack portion 49 which is upright in the substantially vehicle-height direction, and into which the gas flows easily. As a result, the slack portion 49 is instantly inflated. At this time, after the gas hits the lower surface of the strap 70 having the substantially trapezoid shape, the gas flows to the upper surface of the strap 70 through the gaps 72 and 74 that are formed on the left and right sides of the strap 70. As a result, the slack portion 49 is inflated. That is, the slack portion 49 protrudes toward the top of the vehicle (i.e., in the direction shown by an arrow "A" in FIG. 6B), and forms the root portion 48. However, the strap 70 pulls the connection root portion 48C of the root portion 48 to stop the root portion 48 from becoming spherical. Therefore, the root portion 48 does not contact the windshield 56.

Because the root portion 48 is expanded and deployed quickly toward the substantially top of the vehicle, a "wall" sufficiently stretched by the gas is formed in an airbag deployment area at the position close to the front of the vehicle. Then, as shown in FIG. 6C, the airbag folded portion 62 is unfolded by the reaction force from the "wall", and the airbag folded portion 62 is deployed toward the occupant seated at the passenger seat (i.e., in the direction shown by an arrow "B" in FIG. 6C). Thus, the left and right airbags 44 and 46 are formed. In this process, the upper edges of the left and right airbags 44 and 46 contact the windshield 56 at two left and right positions to stabilize the posture of the left and right airbags 44 and 46.

Next, the effects of the strap 70 will be described.

If the strap 70 were not provided, the root portion 48 would be inflated to have a spherical shape by the gas. This would result in the variations of the direction in which the left and right airbags 44 and 46 connected to the root portion 48 are deployed. In addition, as the root portion 48 having a spherical shape is larger, the time required to inflate the root portion 48 is longer. Therefore, the left and right airbag 44 and 46 would be deployed before the inflation of the root portion 48 is completed. This would also result in the variations of the direction in which the left and right airbag 44 and 46 are deployed.

Thus, the strap 70 connects the base-end portion 48B of the root portion 48 to the connection root portion 48C positioned between the root portions of the left and right airbags 44 and 46 (i.e., the right-airbag root portion and the left-airbag root portion). The strap 70 pulls the connection root portion 48 toward the base-end portion 48B of the root portion 48, thereby reducing the volume of the root portion 48. Also, because the strap 70 pulls the connection root portion 48C, the root portion 48 has a shape obtained by stacking two cylinders (i.e., the root portion 48 has a substantially heart shape in the lateral view), instead of the spherical shape. Thus, the left and right airbags 44 and 46 are deployed in the direction in which the two portions of the root portion 48 protrude. This regulates the direction in which the left and right airbags 44 and 46 are deployed. Thus, it is possible to inflate the root portion 48 early, and to regulate the direction in which the left and right airbags 44 and 46 are deployed. As a result, the direction in which the left and right airbags 44 and 46 are deployed is stabilized early.

In this embodiment, the strap 70 is provided in the root portion 48. Also, in the lateral view, the peripheral length L2 from the junction portion (point A) to the front edge (point B) of the bag-protrusion opening 60 is longer than or equal to the peripheral length L1 from the junction portion (point A) to the rear edge (point C) of the bag-protrusion opening 60. The junction portion (point A) is the portion where the connection root portion 48C is connected to the strap 70. In other words, the length of the strap 70 and the position of the junction portion (point A) are set such that the peripheral length L2 is longer than or equal to the peripheral length L1. Therefore, a vehicle front-side portion of the root portion 48, which has the peripheral length L2, is inflated earlier than a vehicle rear-side portion of the root portion 48, which has the peripheral length L1. Thus, the vehicle front-side portion fills the space between the windshield 56 and the instrument panel 12 early.

That is, as described above, because the strap 70 pulls the connection root portion 48C, the root portion 48 has a substantially heart shape in the lateral view. Therefore, the left and right airbags 44 and 46 are deployed in the direction in which the two portions of the root portion 48 protrude. If the peripheral length L1 were longer than the peripheral length L2 unlike the invention, the lower portion of the root portion 48 would be inflated quickly, and the upper portion of the root portion 48 would be inflated slowly. In this case, the root portion 48 would not function well as the "wall" for deploying the left and right airbags 44 and 46. This would result in the variations of the direction in which the left and right airbags 44 and 46 are deployed. Thus, if the root portion 48 were deformed by the strap 70 such that the peripheral length L1 is longer than the peripheral length L2, a great effect would not be obtained. Accordingly, it is extremely effective to set the peripheral lengths L1 and L2 such that the peripheral length L2 is longer than or equal to the peripheral length L1. By setting the peripheral lengths L1 and L2 such that the peripheral length L2 is longer than or equal to the peripheral length L1, the root portion 48 is deformed and made compact by pulling the connection root portion 48C using the strap 70, the gas is introduced to the upper portion of the root portion 48 (i.e., the portion above the strap 70) to inflate this portion instantly, and "the wall" is formed between the windshield 56 and the left and right airbags 44 and 46 quickly to generate the reaction force.

Thus, according to the embodiment, it is possible to further stabilize the direction in which the left and right airbags 44 and 46 are deployed, as compared to the case where the strap is simply provided in the root portion 48.

Also, according to the embodiment, the gas injected from the inflator 28 is supplied to the left and right airbags 44 and 46 through the gaps 74 and 72 on the left and right sides of the strap 70. In this embodiment, because the strap 70 has a substantially trapezoid shape, the vehicle front-side portion of the root portion 48 can be inflated early, as compared to the case where the strap 70 has, for example, a rectangular shape.

Further, in the embodiment, the vehicle rear-side upper side 70D of the strap 70 is offset to the left airbag 44 positioned on the outer side in the vehicle-width direction, with respect to the vehicle front-side base 70C. Thus, the area of the gas supply passage 71A (including the gap 72) is larger than the area of the gas supply passage 71B (including the gap 74). The gas is supplied, through the gas supply passage 71A, to the right airbag 46 that has the volume larger than that of the left airbag 44, and that is positioned on the inner side in the vehicle-width direction. The gas is supplied, through the gas supply passage 71B, to the left airbag 44 that has the volume smaller than that of the right airbag 46, and that is positioned on the outer side in the vehicle-width direction. Accordingly, it is possible to uniformly inflate the left and right airbags 44 and 46 that have different volumes. As a result, in the embodiment, it is possible to inflate the root portion 48 early, and to uniformly inflate the left and right airbags 44 and 46 that have different volumes.

In addition, by adjusting the amount by which the vehicle rear-side upper side 70D of the strap 70 is offset with respect to the vehicle front-side base 70C, and the length of the strap 70, the speed at which the left and right airbags 44 and 46 are deployed can be easily adjusted to a predetermined speed.

Also, in the embodiment, the length of the strap 70 and the position of the junction portion (point A) are set such that the inflated root portion 48 does not contact the windshield 56. Therefore, it is possible to avoid the situation where a large load is input to a specific portion of the windshield 56 in the early stage of inflation of the passenger-seat airbag 32.

Further, the length of the strap 70 and the position of the junction portion (point A) are set such that the upper edges of the left and right airbags 44 and 46 contact the windshield 56 at two left and right positions. Therefore, it is possible to stabilize the direction in which the left and right airbags 44 and 46 are deployed. Also, it is possible to stabilize the posture of the left and right airbags 44 and 46 when the passenger-seat airbag 32 is completely deployed. As described above, as shown in FIG. 6C, after the root portion 48 is inflated, the upper edge of each of the left and right airbags 44 and 46 contacts the windshield 56 at the position shown by the line "P", which is relatively close to the root portion 48. That is, the upper edges of the left and right airbags 44 and 46 contact the windshield 56 at two right and left positions in this stage. This is extremely effective to stabilize the direction in which the left and right airbags 44 and 46 are deployed.

Thus, in the embodiment, it is possible to avoid the situation where a large load is input to a specific portion of the windshield 56. Also, it is possible to further stabilize the direction in which the left and right airbags 44 and 46 are deployed and the posture of the left and right airbags 44 and 46 after the left and right airbags 44 and 46 are deployed.

Further, the airbag folded portion 62 is formed mainly by rolling up the left and right airbags 44 and 46, the root portion 48 is made slack to form the slack portion, and the slack portion is made upright along the airbag folded portion 62. The airbag folded portion 62 is positioned closer to the rear of the vehicle than the root portion 48 is, and the root portion 48 is positioned closer to the front of the vehicle than the airbag folded portion 62 is when the passenger-seat airbag 32 is provided in the vehicle. Thus, the gas injected from the inflator 28 flows into the slack portion 49 that forms the root portion 48 more easily than into the airbag folded portion 62. Therefore, the root portion 48 is expanded and deployed earlier than the airbag folded portion 62. Also, at this time, the root portion 48, which connects the root portions of the left and right airbags 44 and 46 (i.e., the left-airbag root portion and the right-airbag root portion), forms "the wall". As a result, it is possible to extremely effectively stabilize the direction in which the left and right airbags 44 and 46 are expanded and deployed toward the passenger seat.

Further, by accordion-folding the tip portion 49A of the slack portion 49 that forms the root portion 48, the root portion 48 can be expanded and deployed quickly even if the height of the slack portion 49 is larger than that of the folded left and right airbags 44 and 46. That is, the root portion 48 is made slack to form slack portion 49 when the airbag body is folded, the slack portion 49 of the root portion 48 may be somewhat long in the lateral view. Therefore, when the slack portion 49 is made upright along the airbag folded portion 62, the tip portion 49A may protrude beyond the airbag folded portion 62. In this case, by accordion-folding the tip portion 49A of the slack portion 49, the root portion 48 is not prevented from being expanded and deployed quickly.

Thus, by folding the passenger-seat airbag 32 according to the embodiment using the devised method, the root portion 48 can be expanded and deployed quickly.

Recently, vehicles have been designed such that the angle between the windshield 56 and the top wall portion 12A of the instrument panel 12 is extremely small as compared to conventional vehicles. In such vehicle models, it is very useful to deploy the passenger-seat airbag 32 in a given direction with high accuracy.

III. Other Embodiments

Figure 7:
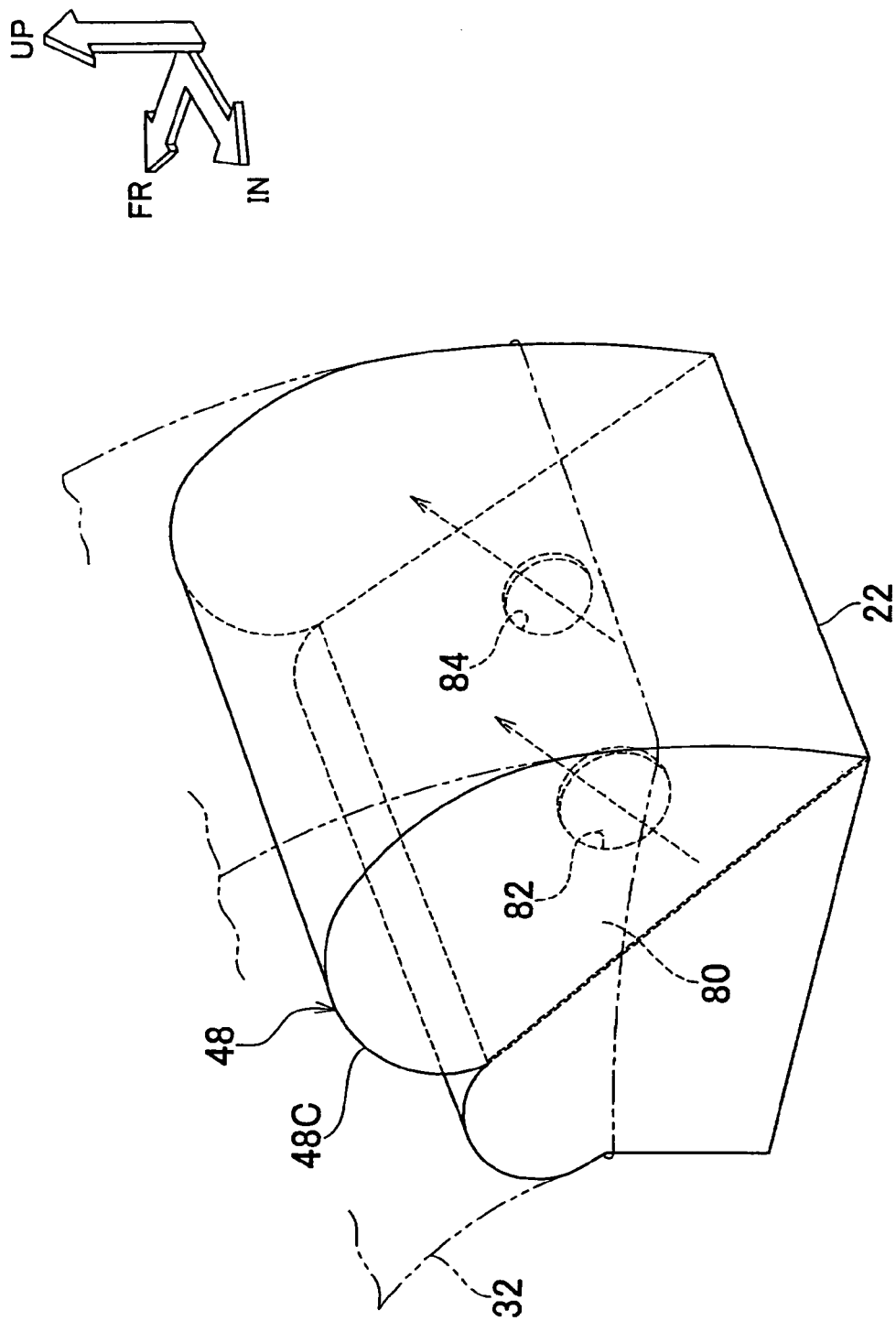
FIG. 7 is an enlarged perspective view of a main portion of a strap according to another embodiment of the invention.

As shown in FIG. 7, in this embodiment, the strap 80 has a rectangular shape in the plan view. Because the volume of the right airbag 46 positioned on the inner side in the vehicle-width direction is larger than the volume of the left airbag 44 positioned on the outer side in the vehicle-width direction, the opening area of a gas supply hole 82 of the strap 80 on the inner side is larger than the opening area of a gas supply hole 84 of the strap 80 on the outer side.

Accordingly, in this embodiment as well, it is possible to uniformly inflate the left and right airbags 44 and 46 that have different volumes. Thus, it is possible to inflate the root portion 48 early, and to uniformly inflate the left and right airbags 44 and 46 that have different volumes.

In addition, by adjusting the opening areas of the gas supply holes 82 and 84, the speed at which the left and right airbags 44 and 46 are deployed can be easily adjusted to a predetermined speed.

IV. Supplementary Explanation of the Embodiment

In the above-described embodiment, the airbag folded portion 62 is formed mainly by rolling up the left and right airbags 44 and 46. However, the invention is applied also to the case where the airbag folded portion 62 is formed mainly by accordion-folding the left and right airbags 44 and 46, and the case where the airbag folded portion is formed by rolling up the left and right airbags 44 and 46, and accordion-folding the left and right airbags 44 and 46 substantially the same number of times.

In the above-described embodiment, the tip portion 49A of the slack portion 49 is accordion-folded toward the airbag folded portion 62. However, the invention is applied also to the case where the tip portion 49A of the slack portion 49 is bent toward the airbag folded portion 62 at a substantially right angle, instead of being accordion-folded, and the case where the tip portion 49A of the slack portion 49 extends straight, instead of being bent.

The distinction between the accordion-folding and the rolling-up will be described. The phrase "the left and right airbags 44 and 46 are accordion-folded" signifies that the left and right airbags 44 and 46 are folded by 180 degrees once in one direction, and then are folded by 180 degrees in the opposite direction. The phrase "the left and right airbags 44 and 46 are rolled up" signifies that the left and right airbags 44 and 46 are folded by 180 degrees once in one direction, and then are folded by 180 degrees in the same direction.

In the above-described embodiments, the length of the strap 70 and the position of the junction portion (point A) are set such that the peripheral length L2 is longer than or equal to the peripheral length L1. However, more preferably, the length of the strap 70 and the position of the junction portion (point A) are set such that the peripheral length L2 is longer than the peripheral length L1.

Further, in the above-described embodiments, the strap 70 has a substantially trapezoid in the plan view, and the strap 80 has a rectangular shape in the plan view. However, the planar shape of the strap is not limited to these two shapes. That is, the strap may have other shapes. When employing a strap that does not have an opening, it is appropriate that the shape of the strap be similar to the substantially trapezoid shape of the strap 70. When employing a strap that has an opening, it is appropriate that the shape of the strap be similar to the rectangular shape of the strap 80.

While the invention has been described with reference to example embodiment thereof, it should be understood that the invention is not limited to the example embodiments or constructions. To the contrary, the invention is intended to cover various modifications and equivalent arrangements. In addition, while the various elements of the example embodiment are shown in various combinations and configurations, which are exemplary, other combinations and configurations, including more, less or only a single element, are also within the spirit and scope of the invention.

The invention claimed is:

1. A passenger-seat airbag that is folded and stored in an airbag case fixed in an instrument panel, and that is protruded from a bag-protrusion opening formed in the instrument panel, and is deployed toward a passenger seat when a frontal collision occurs, comprising:
    a left airbag and a right airbag that correspond to shoulders of an occupant seated at the passenger seat;
    a root portion that receives gas injected from an inflator when the inflator operates, and that connects a left-airbag root portion and a right-airbag root portion; and
    a strap that connects a base-end portion of the root portion to a connection root portion positioned between the left-airbag root portion and the right-airbag root portion, wherein in a lateral view, the root portion is heart shaped when inflated, and a peripheral length from a junction portion between the connection root portion and the strap to a front edge of the bag-protrusion opening is longer than or equal to a peripheral length from the junction portion between the connection root portion and the strap to a rear edge of the bag-protrusion opening.

2. The passenger-seat airbag according to claim 1, wherein:
    a volume of one of the left and right airbags, which is positioned on an inner side in a vehicle-width direction, is larger than a volume of another of the left and right airbags, which is positioned on an outer side in the vehicle-width direction; and
    the strap has a substantially trapezoid shape in which a vehicle front-side base is longer than a vehicle rear-side upper side, and the vehicle rear-side upper side is offset to the airbag positioned on the outer side in the vehicle-width direction, with respect to the vehicle front-side base.

3. The passenger-seat airbag according to claim 1, wherein:
    a volume of one of the left and right airbags, which is positioned on an inner side in a vehicle-width direction, is larger than a volume of another of the left and right airbags, which is positioned on an outer side in the vehicle-width direction; and
    gas supply holes, through which the gas is supplied to the left and right airbags, are formed in the strap, opening areas of the gas supply holes are different from each other, and the opening areas correspond to the volumes of the left and right airbags.

4. The passenger-seat airbag according to claim 1, wherein:
    a length of the strap and a position of the junction portion are set such that the inflated root portion does not contact a windshield, and upper edges of the left and right airbags contact the windshield at two left and right positions when the passenger-seat airbag is completely deployed.

5. The passenger-seat airbag according to claim 1, wherein an airbag folded portion is formed by folding an airbag body which is positioned closer to a rear of a vehicle than the root portion is when the passenger-seat airbag is provided in the vehicle.

6. The passenger-seat airbag according to claim 5, wherein the airbag folded portion is formed mainly by rolling up the airbag body.

7. The passenger-seat airbag according to claim 5, wherein the airbag folded portion is formed mainly by accordion-folding the airbag body.

8. The passenger-seat airbag according to claim 5, wherein the airbag folded portion is formed by rolling up the airbag body and accordion-folding the airbag body substantially the same number of times.

9. The passenger-seat airbag according to claim 5, wherein a tip portion of the root portion is accordion-folded once toward the airbag folded portion.

10. The passenger-seat airbag according to claim 5, wherein a tip portion of the root portion is bent toward the airbag folded portion at a substantially right angle.

11. The passenger-seat airbag according to claim 5, wherein the root portion, which is positioned closer to a front of the vehicle than the airbag body is when the passenger-seat airbag is provided in the vehicle, is made slack to form a slack portion, and the slack portion is folded separately from the airbag folded portion.

12. The passenger-seat airbag according to claim 11, wherein:
    the slack portion is made upright along the airbag folded portion.

13. The passenger-seat airbag according to claim 11, wherein the airbag folded portion is formed mainly by rolling up the left and right airbags which are positioned closer to a rear of a vehicle than the root portion is when the passenger-seat airbag is provided in the vehicle; the root portion which is positioned closer to a front of the vehicle than the left and right airbags are when the passenger-seat airbag is provided in the vehicle, is made slack to form the slack portion; the slack portion is made upright along the airbag folded portion that is formed mainly by rolling up the left and right airbags; and a tip portion of the slack portion is accordion-folded.

14. A passenger-seat airbag that is folded and stored in an airbag case fixed in an instrument panel, and that is protruded from a bag-protrusion opening formed in the instrument panel, and is deployed toward a passenger seat when a frontal collision occurs, comprising:
    a left airbag and a right airbag that correspond to shoulders of an occupant seated at the passenger seat;
    a root portion that receives gas injected from an inflator when the inflator operates, and that connects a left-airbag root portion and a right-airbag root portion; and
    a strap that connects a base-end portion of the root portion to a connection root portion positioned between the left-airbag root portion and the right-airbag root portion, wherein in a lateral view, the root portion is substantially heart shaped when inflated, and a peripheral length from a junction portion between the connection root portion and the strap to a front edge of the bag-protrusion opening is longer than or equal to a peripheral length from the junction portion between the connection root portion and the strap to a rear edge of the bag-protrusion opening;

wherein:

the volume of one of the left and right airbags, which is positioned on an inner side in a vehicle-width direction, is larger than the volume of another of the left and right airbags, which is positioned on an outer side in the vehicle-width direction; and the strap has a rectangular shape, gas supply holes, through which the gas is supplied to the left and right airbags, are formed in the strap, and an opening area of the gas supply hole corresponding to the airbag positioned on the inner side in the vehicle-width direction is larger than an opening area of the gas supply hole corresponding to the airbag positioned on the outer side in the vehicle-width direction.

* * * * *